(12) United States Patent
Gabriel

(10) Patent No.: US 7,196,892 B2
(45) Date of Patent: Mar. 27, 2007

(54) METHOD AND APPARATUS FOR ISOLATING RFI, EMI, AND NOISE TRANSIENTS IN POWER SUPPLY CIRCUITS

(76) Inventor: Caelin Gabriel, 5592 NE. Minder Rd., Suite 101, Poulsbo, WA (US) 98370

( * ) Notice: Subject to any disclaimer, the term of this patent is extended or adjusted under 35 U.S.C. 154(b) by 567 days.

(21) Appl. No.: 10/411,956

(22) Filed: Apr. 10, 2003

(65) Prior Publication Data

US 2003/0234581 A1 Dec. 25, 2003

Related U.S. Application Data

(60) Provisional application No. 60/371,614, filed on Apr. 10, 2002.

(51) Int. Cl.
*H02H 9/00* (2006.01)
(52) U.S. Cl. ...................... 361/118; 361/111
(58) Field of Classification Search ................ 361/111, 361/118
See application file for complete search history.

(56) References Cited

U.S. PATENT DOCUMENTS

| | | | | |
|---|---|---|---|---|
| 5,132,606 A | * | 7/1992 | Herbert | 323/266 |
| 5,331,534 A | * | 7/1994 | Suzuki et al. | 363/20 |
| 5,351,179 A | * | 9/1994 | Tsai et al. | 363/53 |
| 5,673,186 A | * | 9/1997 | Johnson | 363/53 |
| 5,790,390 A | * | 8/1998 | Kayser | 363/20 |
| 5,818,704 A | | 10/1998 | Martinez | |
| 6,188,592 B1 | | 2/2001 | Farrington et al. | |
| 6,252,781 B1 | | 6/2001 | Rinne et al. | |
| 6,256,214 B1 | | 7/2001 | Farrington et al. | |
| 6,696,772 B2 | * | 2/2004 | Nieminen | 307/151 |
| 6,738,270 B2 | * | 5/2004 | Saga et al. | 363/50 |
| 6,771,519 B2 | * | 8/2004 | Frus et al. | 363/21.12 |

* cited by examiner

*Primary Examiner*—Stephen W. Jackson
(74) *Attorney, Agent, or Firm*—Craig M. Stainbrook; Stainbrook & Stainbrook, LLP

(57) ABSTRACT

A method and apparatus for isolating and/or eliminating RFI, EMI, and noise transients in power supply circuits. The circuit isolates DC to DC and AC to DC power coupling by use of dual, parallel current paths that are alternately gated. The gating of the switches is controlled by a control module, which ensures that the input and output of the circuit is electromagnetically blocked during any instant in time, while simultaneously ensuring proper and continuous delivery of current to the circuit output load.

9 Claims, 4 Drawing Sheets

METHOD AND APPARATUS FOR ISOLATING RFI, EMI, AND NOISE TRANSIENTS IN POWER SUPPLY CIRCUITS

CROSS-REFERENCES TO RELATED APPLICATIONS

This application claims the benefit of U.S. Provisional Application Ser. No. 60/371,614, filed Apr. 10, 2002.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates generally to electrical circuits, and more specifically to an improved method and associated power supply circuit that provides circuit protection from AC line noise, transient electromagnetic interference, EMI, and RFI.

2. Discussion of the Related Art Including Information Disclose under 37 CFT 1.97 and 37 CFR 1.98

Switched-mode power supplies make use of power transistors or power MOSFETs and typically require the use of a control module. However, the purpose and operation of the semi-conductor switches and of the control module are entirely different from that in the present invention. The primary purpose of a switched-mode circuit is that of voltage regulation, while the primary purpose of the inventive circuit is noise and transient isolation.

Switching supplies eliminate the need for a main power transformer and large storage filter capacitors. Instead they rectify voltage directly from the AC input and store DC in a small capacitor. Then, current is released in pulses by a transistor—controlled by a PWM (pulse width modulated) controller.

Switched-mode supplies have the advantages of light weight, small size and high efficiency. However, they may not be suitable when the primary requirement for the power supply is low noise. The high frequency switching harmonics generated by such a supply require extensive filters to achieve a low noise ratio. In addition, switched-mode supplies do not block line-noise or transients as in the inventive circuit. When the switched-mode rectifiers are in a conduction state and the switching transistor is on, input line noise may pass through to the output. Additionally, the line-connected rectifiers generate significant power harmonics that are kicked-back onto the power line.

Switched-mode supplies do not utilize dual parallel current paths as in the inventive circuit. However, the inventive concepts herein could be added or adapted to various switched-mode designs, which would give them noise-blocking capabilities.

"Synchronous rectification" circuits such as those disclosed in U.S. Pat. Nos. 6,188,592, 5,818,704, 6,252,781 and 6,256,214 may bear some cursory resemblance to the inventive circuit. However, they are similar only in that their fundamental operation requires two controlled switch elements, such a power MOSFET. They do not utilize dual parallel current paths as in the inventive circuit.

Synchronous rectifiers are usually used in DC-DC voltage conversion where the circuit is designed to convert a DC voltage to a lower voltage. A primary example is the "Buck converter". However, the purpose of synchronous rectifiers is to convert voltage, while the purpose of the inventive circuit is noise and interference isolation.

BRIEF SUMMARY OF THE INVENTION

The present invention provides a method and apparatus for isolating and/or eliminating RFI, EMI, and noise transients in power supply circuits. The inventive circuit isolates DC to DC and AC to DC power coupling by "gating" current rather than utilizing conventional filtering methods. The inventive circuit is comprised primarily of "dual parallel" current paths that are alternately gated to ensure continuous current delivery.

The dual parallel paths are created with four switches and two storage elements (e.g., capacitors) where each path is defined by two switches and a capacitor. The "switches" may be a relay, solid-state relay, SCR, power MOSFET or other electronic switch whose on/off state may be controlled. The gating of the switches is controlled by a control module, which ensures that the input and output of the inventive circuit is electromagnetically blocked during any instant in time, while simultaneously ensuring proper and continuous delivery of current to the circuit output load.

The inventive circuit provides near 100% isolation and immunity to power line transmitted noise, transients, RFI and EMI. The inventive circuit eliminates the need for filter coils and high frequency filter capacitors often required for noise reduction in conventional linear power supply designs. The inventive circuit eliminates both common-mode and differential-mode power line noise from entering the power supply. Additionally, the inventive circuit prevents noise generated by the output load circuitry from being "kicked back" onto the DC input or AC power line.

DETAILED DESCRIPTION OF THE INVENTION

Figure 1A:
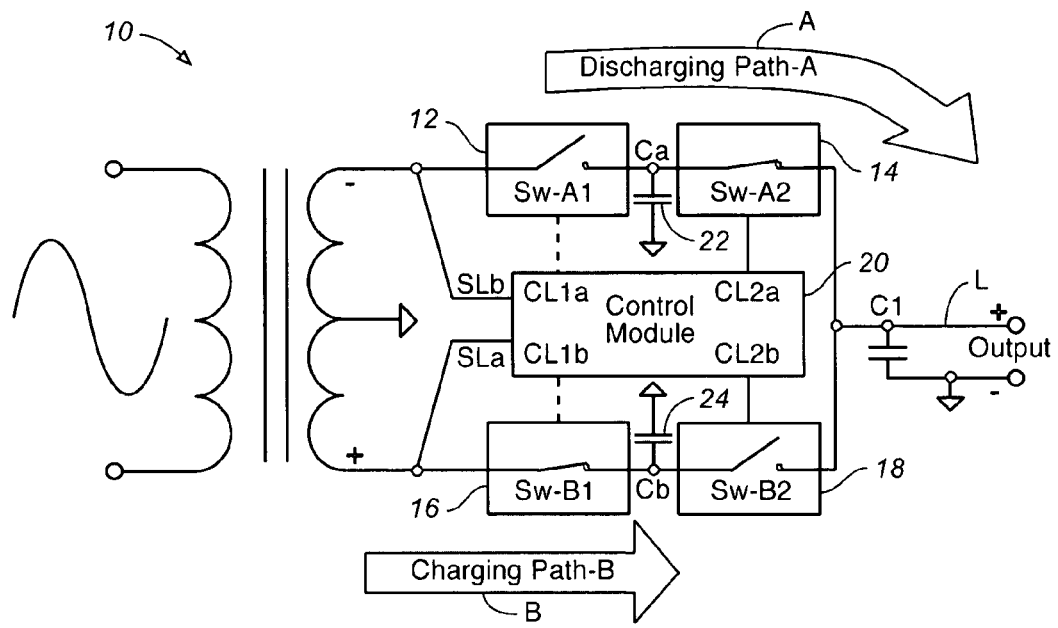
FIGS. 1a and 1b are schematic views of a power supply circuit of this invention in a linear fullwave power supply.
Figure 1B:
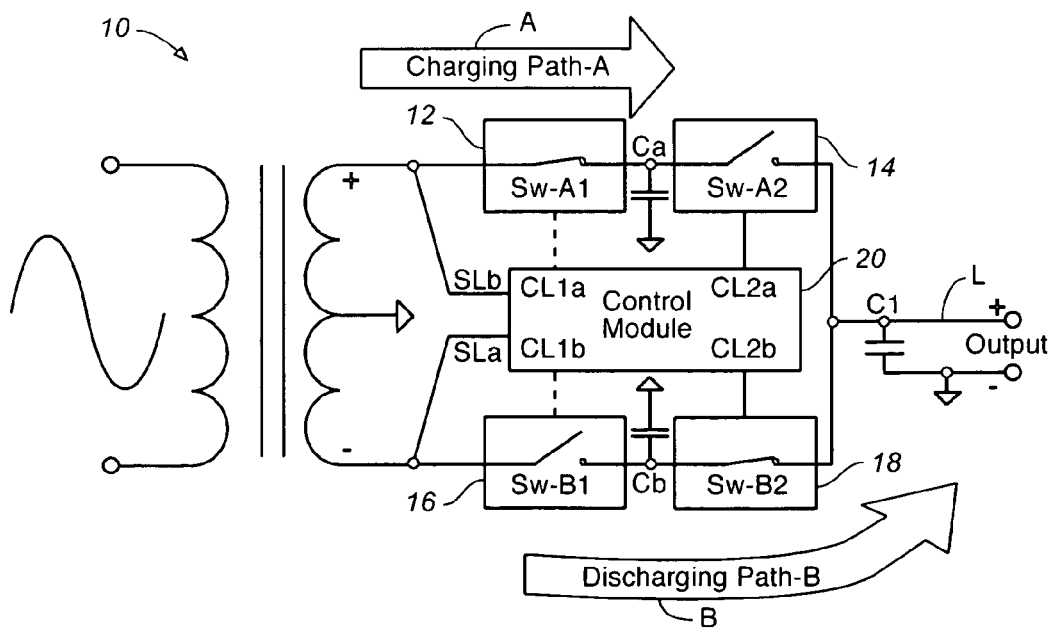

FIGS. 1a and 1b are schematic views of a power supply circuit of this invention in a linear fullwave power supply 10. In operation, the switches 12, 14, 16, and 18 are controlled by the control module 20 in such a manner that current path A is charged by the input voltage, while current path B provides current to the circuit output or load L, and vice versa: as the stored power level of path A begins to drop, the control module 20 "gates" the switches allowing current path A to charge, while the fully charged path B provides current to the output.

During the charge cycle of path A (FIG. 1b), path A's second (post-storage) switch 14 is open, blocking transients and noise from the AC input to the output. Simultaneously, path B's second (post-storage) switch 18 is closed, supplying current to the output load L, while path B's first switch (pre-storage) 16 is in an off condition, blocking AC input transients and noise to the output.

Conversely, during the charge cycle of path B (FIG. 1*a*), path B's second switch 18 is open, blocking transients and noise from the AC input to the output. Simultaneously, path A's second switch 14 is closed, supplying current to the output load L while path A's first (pre-storage) switch 12 is in open condition, blocking AC input transients and noise to the output.

In the inventive circuit, the control module ensures that the following states are true:
- Path A's first switch 12 and second switch 14 are never on at the same time
- Path B's first switch 16 and second switch 18 are never on at the same time
- Path A's second switch 14 and Path B's second switch 18 are never on at the same time
- Path A's second switch 14 and Path B's second switch 18 are alternately gated to supply current to the load
- Path A's first switch 12 and Path B's first switch 16 are alternately gated to charge Path A storage (capacitor 22) and Path B storage (capacitor 24) respectively.

Figure 2:
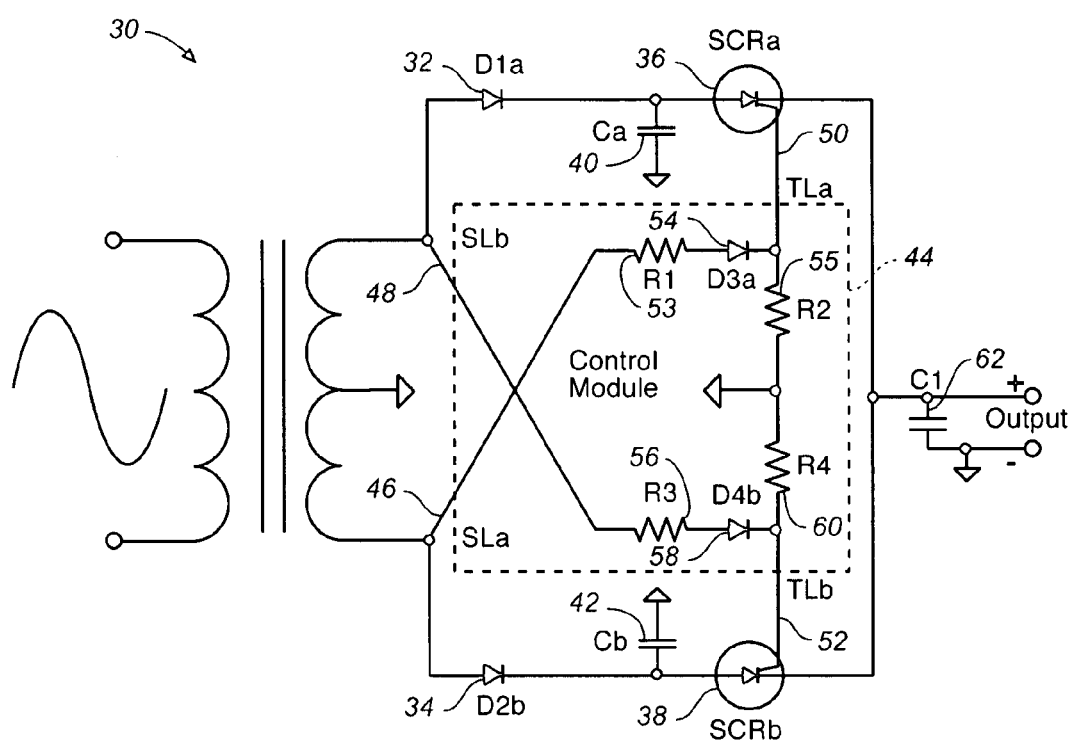
FIG. 2 is a schematic view of a power supply circuit of this invention within a linear fullwave rectified power supply.

FIG. 2 is a schematic view of a power supply circuit of this invention within a linear fullwave rectified power supply 30. The rectifier diodes 32 and 34 serve a dual function, providing AC voltage rectification and acting as path A first switch and path B first switch, respectively. SCRa 36 and SCRb 38 provide the functions of path A second switch and path B second switch, respectively. Diode 32, capacitor 40, and SCRa 36 define current path A, while diode 34, capacitor 42, and SCRb 38 define current path B.

The control module 44 gates the switches synchronized to the AC line frequency. Sense lines SLa 46 and SLb 48 provide a sense signal for the control module by detecting the AC voltage polarity changes. Trigger lines TLa 50 and TLb 52 control the SCR switches. The control module ensures that SCRa 36 and SCRb 38 are never on at the same time.

Since diodes 32 and 34 are free running rectifiers, their conduction state is determined by the AC input frequency. Therefore, the control module must simply determine the conduction state of the rectifiers (sense lines SLa 46 and Slb 48) and synchronize the opening and closing of SCRa 36 and SCRb 38 to the conduction states of the rectifier diodes 32 and 34. Essentially, the control module 44 ensures that SCRa 36 and SCRb 38 are never on at the same time. Also the control module ensures that SCRa 36 only turns on after diode 32 goes to an off state. Similarly, the control module ensures that SCRb 38 only turns on after diode 34 goes to an off state. These conditions ensure that AC line input transients and noise are blocked to the circuit output.

In this case, the control module 44 is a simple circuit that detects the incoming AC polarity changes and triggers the corresponding SCR. The control module is comprised of resistor 50, diode 52, resistor 54, resistor 56, diode 58, and resistor 60.

The size of capacitors 40 and 42 must be selected carefully to ensure that they can provide sufficient worst case current to the load. The size of power supply storage capacitor 62 must be chosen to ensure continuous current delivery due to the fact that there is a transition period (near the AC zero crossing) where both SCRa 36 and SCRb 38 will be in an off condition.

Figure 3A:
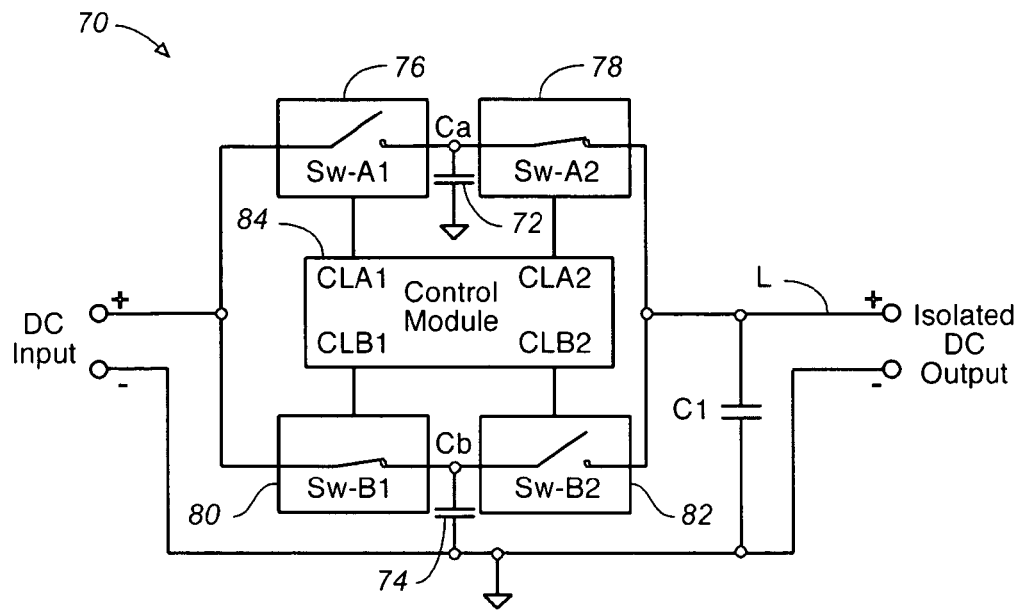
FIGS. 3a and 3b are schematic views of a power supply circuit of this invention in a buffered DC voltage supply.
Figure 3B:
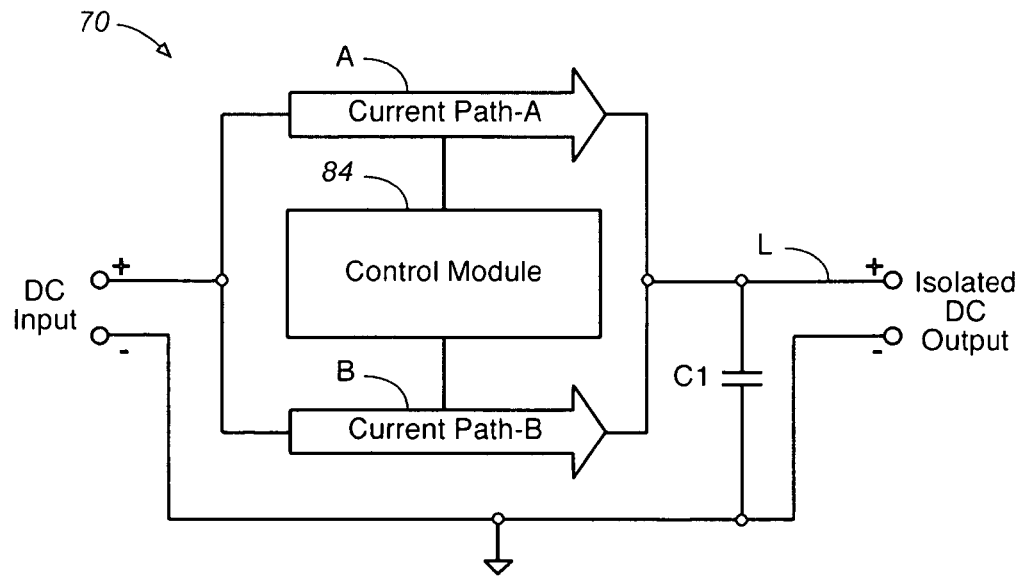

FIGS. 3*a* and 3*b* are schematic views of a power supply circuit of this invention in a buffered DC voltage supply 70. Essentially the circuit splits the DC input into two current paths that are alternately charged and discharged. Each path has an independent storage element, which is represented by capacitors 72 and 74. Current path A is comprised of path A first switch 76, path A second switch 78, and capacitor 72, while current path B is comprised of path B first switch 80, path B second switch 82, and capacitor 74.

The switches 76, 78, 80, and 82 may be any power switches that can be gated such as power MOSFETs or other state controlled switches.

In operation, the switches are controlled by the control module 84 in such a manner that path A is charged by the input, while path B provides current to the circuit output or load L. As the stored power level of path A begins to drop, the control module "gates" the switches allowing current path A to charge, while the fully charged path B provides current to the output. The switching frequency may be synchronized to the AC line frequency or a higher frequency may be used depending upon other design requirements.

Path A Charge/Path B Discharge Cycle: Path A first switch 76 is closed while Path A second switch 78 is open allowing Path A capacitor 72 to be charged by the input voltage. Path A second switch 78 being open prevents source EMI from being coupled through path A to the output. At the same time, Path B first switch 80 is closed while Path B second switch 82 is open allowing Path B capacitor 74 to provide current to the load L. Path B first switch 80 being open prevents source EMI from being coupled through path B to the output.

Path B Charge/Path A Discharge Cycle: Path B first switch 80 is closed while Path B second switch 82 is open allowing Path B capacitor 74 to be charged by the input voltage. Path B second switch 82 being open prevents source EMI from being coupled through path B to the output. At the same time, Path A first switch 76 is closed while Path A second switch 78 is open allowing Path A capacitor 72 to provide current to the load. Path A first switch 76 being open prevents source EMI from being coupled through path A to the output.

Multiple circuits of this invention may be used to provide isolation between various circuit elements or PCBs. For example, one circuit would provide isolation to a digital circuit while a second circuit would provide isolation to an analog circuit. Due to the inventive circuit's unique blocking action, the noise generated by one circuit section cannot be kicked-back onto the main power supply.

Figure 4:
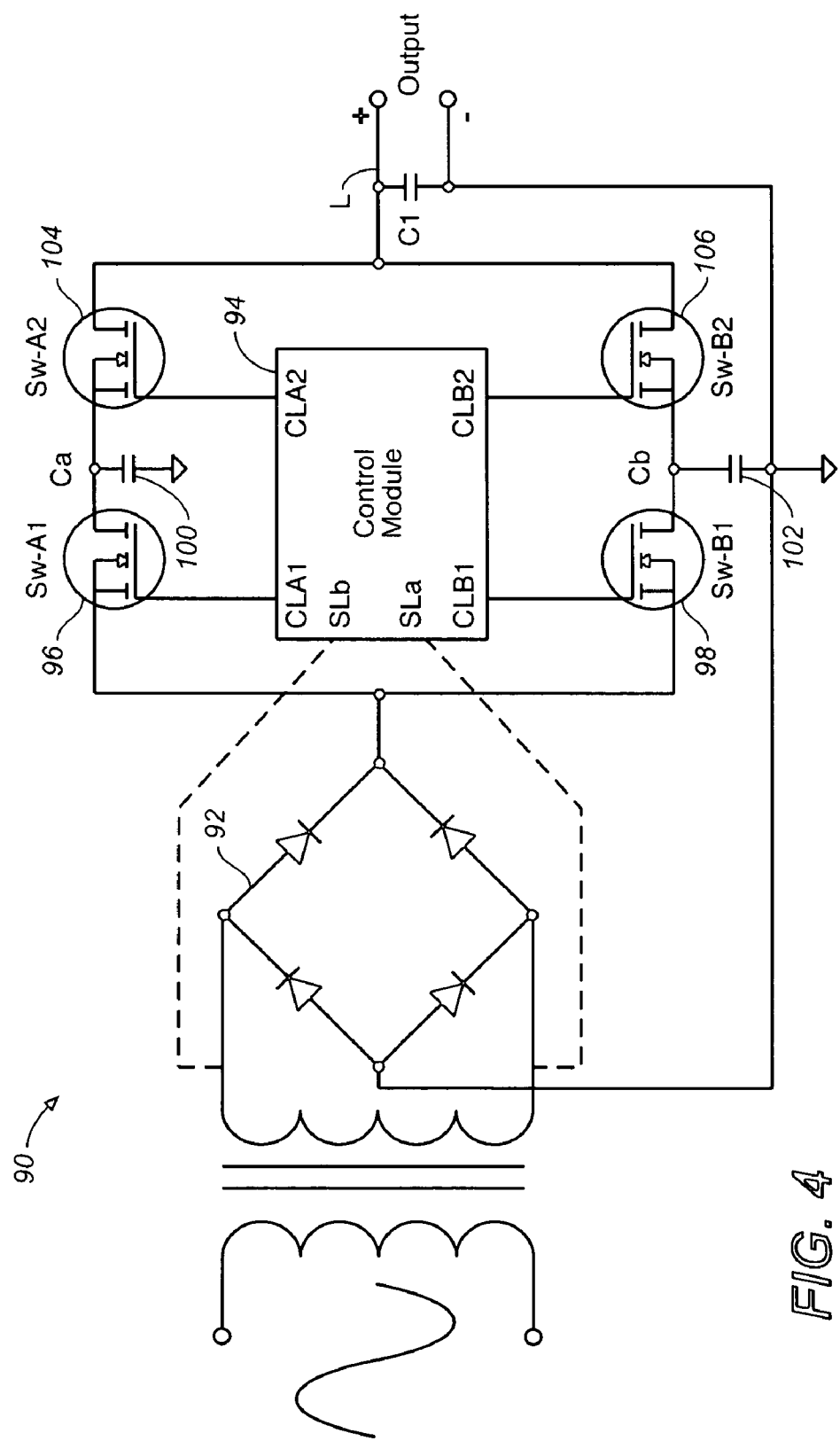
FIG. 4 is a schematic view of a power supply circuit of this invention in a linear fullwave bridge rectified power supply.

FIG. 4 is a schematic view of a power supply circuit of this invention in a linear fullwave bridge rectified power supply 90. At the output of the bridge rectifier 92, the inventive circuit splits the DC voltage into dual parallel current paths. The control module 94 alternately gates the switches Path A first switch 96 and Path B first switch 98 charging capacitors 100 and 102 respectively. The control module 94 supplies current to the output by alternately gating Path A second switch 104 and Path B second switch 106.

The control module ensures that AC line noise and rectifier noise are blocked to the output by ensuring that the following conditions are maintained.
- Path A's first switch 96 and second switch 104 are never on at the same time
- Path B's first switch 98 and second switch 106 are never on at the same time
- Path A's second switch 104 and Path B's second switch 106 are never on at the same time Path A's second switch 104 and Path B's second switch 106 are alternately gated to supply current to the load Path A's first switch 96 and Path B's first switch 98 are alternately gated to charge Path A storage (capacitor 100) and Path B storage (capacitor 102) respectively.

The control module may be clocked at the AC line frequency or a higher frequency depending upon the desired output requirements.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

The invention claimed is:

1. An apparatus for isolating RFI, EMI, and noise transients in AC power supply circuits, the power supply circuit having an input and an output, said apparatus comprising:
   a first current path having a first current path first switch, first current path storage means, and a first current path second switch;
   a second current path parallel to said first current path, and having a second current path first switch second current path storage means, and a second current path second switch; and
   a control module for controlling all of said switches such that said first and second current paths alternate operation in time with the corresponding positive and negative polarities of the power line frecquency, and such that during the charge cycle of said first current path, said first current path second switch is open and blocks transients and noise from the input to the output, and said second current path second switch is closed, allowing the supply of current to the output, and said second current path first switch is open and blocks input transients and noise to the output, and during the charge cycle of said second current path, said second current path second switch is open and blocks transients and noise from the input to the output, and said first current path second switch is closed, allowing the supply of current to the output while said first current path first switch is open and blocks input transients and noise to the output.

2. The apparatus of claim 1 wherein said first current path storage means comprises a capacitor.

3. The apparatus of claim 1 wherein said second current path storage means comprises a capacitor.

4. The apparatus of claim 1 wherein said first current path first switch is taken from one of a relay, solid-state relay, SCR, power MOSFET, and electronic switch whose on/off state may be controlled.

5. The apparatus of claim 1 wherein said first current path second switch is taken from one of a relay, solid-state relay, SCR, power MOSFET, and electronic switch whose on/off state may be controlled.

6. The apparatus of claim 1 wherein said second current path first switch is taken from one of a relay, solid-state relay, SCR, power MOSFET, and electronic switch whose on/off state may be controlled.

7. The apparatus of claim 1 wherein said second current path second switch is taken from one of a relay, solid-state relay, SCR, power MOSFET, and electronic switch whose on/off state may be controlled.

8. An apparatus for isolating RFI, EMI, and noise transients in AC power supply circuits, the power supply circuit having an input and an output, said apparatus comprising:
   a first current path having a first current path first switch, first current path storage means, and a first current path second switch;
   a second current path parallel to said first current path, and having a second current path first switch, second current path storage means, and a second current path second switch; and
   control circuitry adapted to control said apparatus such that said current paths alternate operation in time with the corresponding positive and negative polarities of the power line frequency, and such that said first current path first switch and first current path second switch are never on at the same time, said second current path first switch and second current path second switch are never on at the same time, said first current path second switch and said second current path second switch are never on at the same time, and said first current path second switch and second current path second switch are alternately gated to supply current to the load.

9. The apparatus of claim 8 wherein said first current path first switch and said second current path first switch are alternately gated to charge said first current path storage means and said second current path storage means respectively.

* * * * *